United States Patent [19]
Miller

[11] Patent Number: 5,387,451
[45] Date of Patent: Feb. 7, 1995

[54] FLYWHEEL CONTAINMENT DEVICE

[75] Inventor: Robin M. Miller, Ellington, Conn.

[73] Assignee: United Technologies Corporation, Hartford, Conn.

[21] Appl. No.: 90,730

[22] Filed: Jul. 13, 1993

[51] Int. Cl.$^6$ ................................. B32B 1/06
[52] U.S. Cl. ....................... 428/65; 428/116; 74/572
[58] Field of Search ............ 428/65, 73, 76, 116; 74/572

[56] References Cited

U.S. PATENT DOCUMENTS 3,068,016 12/1962 Dega ................................ 277/96
5,188,507 2/1993 Sweeney ...................... 415/173.1

Primary Examiner—Alexander S. Thomas
Attorney, Agent, or Firm—George J. Romanik; Christine M. Wilkes

[57] ABSTRACT

The flywheel containment device (2) includes a shaft (4), defining an axis of rotation, and a flywheel (6) having an annular shaped cross-section perpendicular to the axis of rotation. The flywheel (6) is connected to the shaft (4) and has an outer diameter (5) and an inner diameter (3). The containment device (2) also comprises an annular shaped honeycomb structure (8) with an annular shaped honeycomb layer (10) having an outer diameter and an inner diameter greater than the outer diameter of the flywheel (6). The honeycomb layer (10) comprises a plurality of pores (11) that are open on the inner diameter of the honeycomb layer (10) to trap dust created if the flywheel (6) fails. The honeycomb layer (10) is positioned around the outer diameter of the flywheel (6) such that the honeycomb structure (8) is independent from the flywheel (6). The device (2) further includes means for supporting the honeycomb structure (8) such that the honeycomb structure (8) is capable of rotating independently from the flywheel (6). A containment vessel (18) is also positioned around the outer diameter of the honeycomb structure (8).

18 Claims, 2 Drawing Sheets

FLYWHEEL CONTAINMENT DEVICE

TECHNICAL FIELD

The present invention relates generally to a containment device and particularly to a containment device for a flywheel energy storage system.

BACKGROUND ART

Traditionally, flywheels have been made of metals such as steel. Due to the high density and moderate specific strength of many metals, this material may not be optimal for flywheel construction. In addition, metal flywheels tend to fail in large, sharp fragments at high speeds. Accordingly, composite materials such as fiber reinforced resin matrix composites have been used to produce flywheels since composite materials have a higher specific strength than metals.

Even though composites may be more advantageous to use in flywheel construction than metals, composite flywheels can still fail at high speeds. Composite flywheels tend to fail by fracturing into flywheel debris such as dust and long strands of fiber.

If the flywheel fails, containment of the dust and fiber strands is necessary to prevent damage to the flywheel and surrounding structures. Conventionally, layers of heavy metals, such as steel and lead, surround the flywheel to absorb the force of the flywheel debris. Although the metal layers prevent sharp edged strands from piercing the containment device, they often fracture. In addition, the metal layers are incapable of capturing the dust. If the dust is not captured, it may flow into areas of a vacuum chamber surrounding the flywheel resulting in the need for full encompassing containment. The metal layers of conventional containment devices are also incapable of dissipating a significant amount of energy into material strain rather than heat.

Additionally, conventional containment devices can be costly and heavy. Consequently, the application of conventional containment devices can be severely limited. For example, conventional containment devices can limit the use of a flywheel energy storage system in mobile environments, such as vehicles.

Accordingly, there exists a need for a light weight, flywheel containment device that captures dust and dissipates a significant amount of energy into material strain rather than heat if the flywheel fails.

Disclosure of the Invention

The present invention relates to a light weight, flywheel containment device that captures dust and dissipates a significant amount of energy into material strain rather than heat if the flywheel fails.

An aspect of the invention includes a shaft, defining an axis of rotation, and a flywheel having an annular shaped cross-section perpendicular to the axis of rotation. The flywheel is connected to the shaft and has an outer diameter and an inner diameter. The containment device also comprises an annular shaped honeycomb structure with an annular shaped honeycomb layer having an outer diameter and an inner diameter greater than the outer diameter of the flywheel. The honeycomb layer comprises a plurality of pores that are open on the inner diameter of the honeycomb layer to trap dust created if the flywheel fails. The honeycomb layer is positioned around the outer diameter of the flywheel such that the honeycomb structure is independent from the flywheel. The device also includes means for supporting the honeycomb structure. A containment vessel is also positioned around the outer diameter of the honeycomb structure.

BEST MODE FOR CARRYING OUT THE INVENTION

Figure 1:
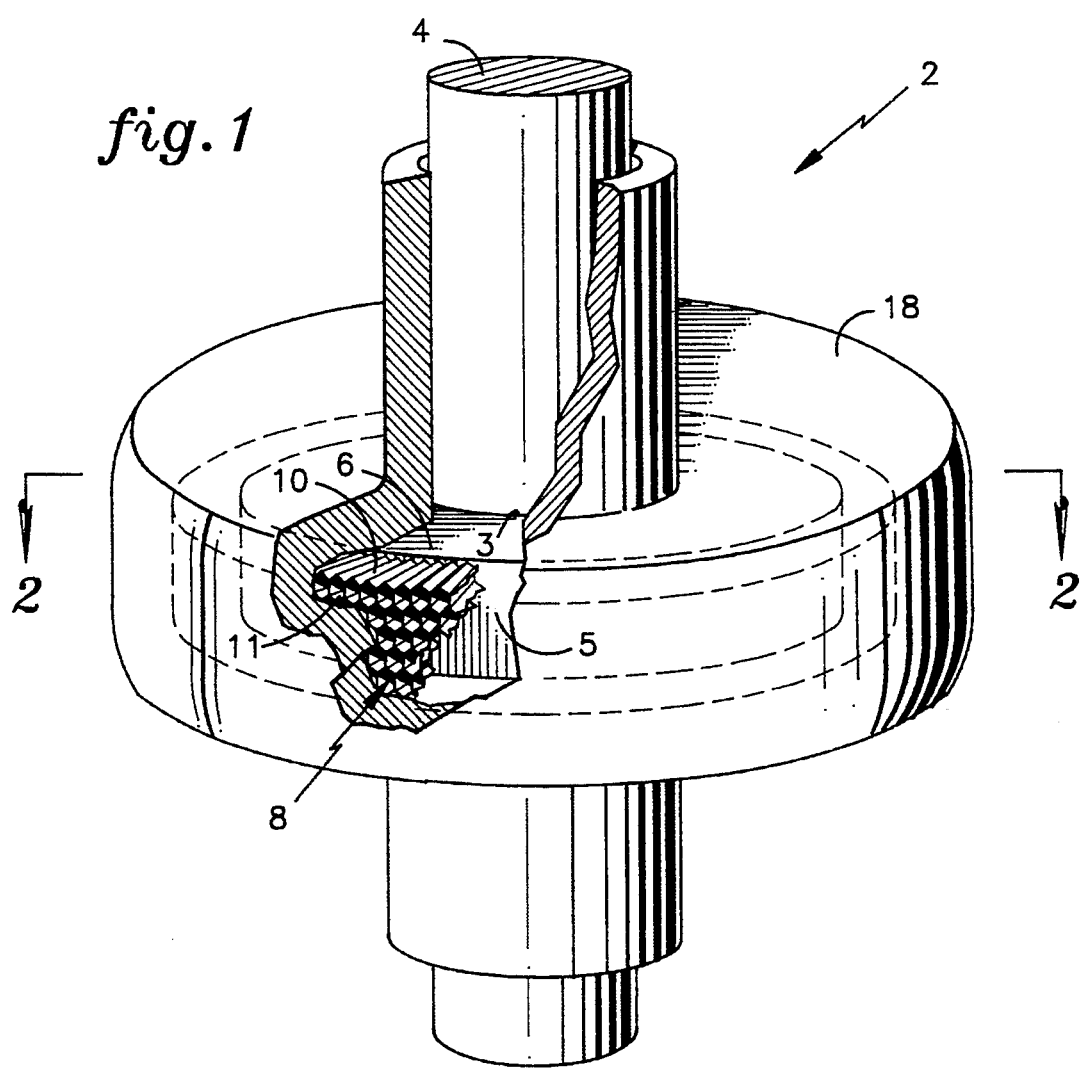
FIG. 1 is a cutaway perspective view of a flywheel containment device of the present invention including a honeycomb structure.

The flywheel containment device 2 of FIG. 1 includes a shaft 4 which defines an axis of rotation and a flywheel 6 having an annular shaped cross-section perpendicular to the axis of rotation. The flywheel 6 is connected to the shaft 4 and has an outer diameter 5 and an inner diameter 3. The device 2 additionally includes an annular shaped honeycomb structure 8. The honeycomb structure 8 enables the flywheel containment device 2 to capture dust and dissipate a significant amount of energy into material strain rather than heat if the flywheel 6 fails.

The flywheel 6 may be made of any material conventionally used in flywheel fabrication. For example, the flywheel 6 may be a composite such as a fiber reinforced, resin matrix composite. Preferably, the flywheel 6 will comprise a fiber such as graphite fiber because of its high specific strength. Continuous fiber reinforced composite flywheels are preferred because the fibers contribute to the composite's hoop strength and elastic modulus.

The honeycomb structure 8, positioned around the outer diameter 5 of the flywheel 6, includes an annular shaped honeycomb layer 10 having an outer diameter and an inner diameter greater than the outer diameter 5 of the flywheel 6. The honeycomb layer 10 includes a plurality of pores 11 that are open on the inner diameter of the honeycomb layer 10 to trap dust created if a small portion of the flywheel 6 fails. The containment of the dust in the pores 11 helps protect the surrounding structures from secondary strikes of the dust due to the dust's momentum. The pores 11 should be sized such that the honeycomb layer 10 may withstand momentum effects from the dust filling the pores 11. Preferably, the volume of the pores 11 may contain at least about 125% of the composite's matrix in the form of dust. Preferably, the porosity of the honeycomb layer 10 is at least about 90% because light weight is desired.

If a larger portion of the flywheel 6 fails, the pores 11 will still capture the dust. Large strands of flywheel material, however, will crush sections of the honeycomb structure 8 and dissipate a significant amount of energy into material strain rather than heat. Although some heat will be generated, the amount is greatly reduced due to the honeycomb structure 8.

The honeycomb layer 10 may be any material that is ductile enough to crumple and absorb energy. Preferably, the honeycomb layer 10 is a solid structure to prevent the layer 10 from easily separating. The honeycomb layer 10 may be a metal or a deformable polymeric material. If the honeycomb layer 10 is a metal, metals such as steel, brass and aluminum may be used. Preferably, the metal will be steel. If the honeycomb layer 10 is a polymeric material, polymers with strong tensile strengths such as acrylonitrile-butadiene-styrene (ABS) are suitable for the honeycomb layer 10. Since most flywheels operate under a vacuum at high speeds, however, a low outgassing material such as stainless steel may be preferred over a polymeric material.

Figure 2:
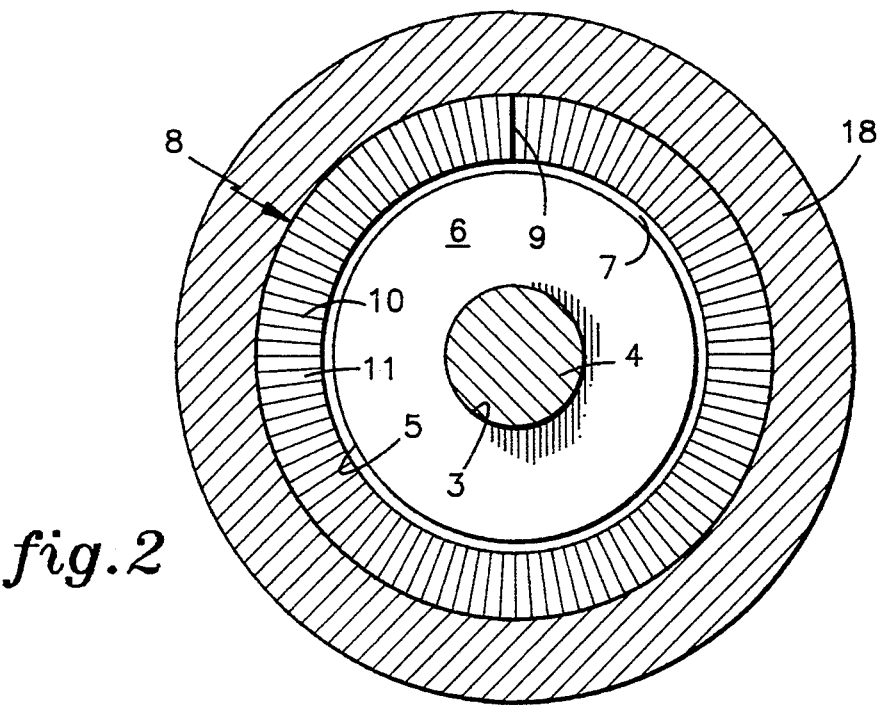
FIG. 2 is a top view of another flywheel containment device of the present invention including a honeycomb structure.

FIG. 2 is a top down view of the device 2 further showing a honeycomb structure 8 with a discontinuity 9. The discontinuity 9 represents the location where ends of the structure 8 come together. This embodiment is more advantageous than a continuous honeycomb structure because the honeycomb structure 8 may be rolled into place for ease of installation. Additionally, manufacturing of the honeycomb structure 8 may also be simplified because a large, continuous structure need not be manufactured. The honeycomb structure 8 may be manufactured in strips and subsequently formed into the honeycomb structure 8.

Figure 3:
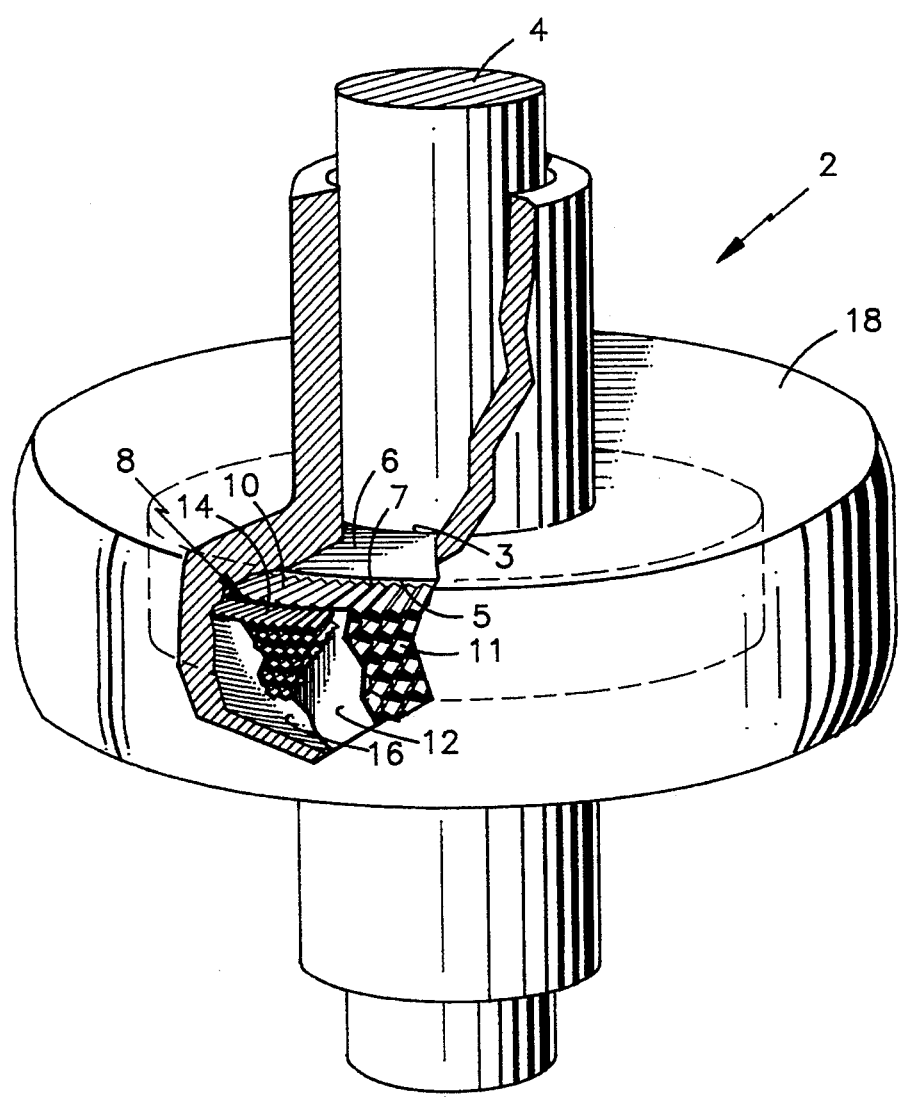
FIG. 3 is a cutaway perspective view of another flywheel containment device of the present invention including a multiple layered honeycomb structure.

As shown in FIGS. 2 and 3, a gap 7 is located between the flywheel 6 and honeycomb structure 8. The width of the gap 7 may be determined according to design specifications based on factors such as the flywheel's material and rotational speed. By making the gap 7 small, the radial component of a strike of debris on the honeycomb structure 8 remains small. This configuration may be desirable to avoid direct impact of debris if flywheel failure is expected to be in large strands.

As shown in FIG. 3, the honeycomb structure 8 may comprise multiple layers to ensure effective containment of the flywheel debris. For example, an annular shaped, metal layer 12, having an outer diameter and inner diameter equal to or greater than the outer diameter of the honeycomb layer 10, may be positioned around the outer diameter of the honeycomb layer 10. The metal layer 12 may be any high strength metal such as steel. If the flywheel 6 fails, the metal layer 12 spreads the load of debris impacting the honeycomb layer 10 to a second honeycomb layer 14. A safe stop of the larger debris may then occur without further damage.

The metal layer's inner diameter may be coated with a material capable of blunting sharp objects. For example, the metal layer 12 may be coated with a material such as nickel or chromium.

An annular shaped, second honeycomb layer 14 with an outer diameter and an inner diameter equal to or greater than the outer diameter of the metal layer 12, may be positioned around the metal layer 12. The second honeycomb layer 14 comprises a plurality of pores that absorb energy by deforming if the flywheel 6 fails.

Preferably, the porosity of the second honeycomb layer 14 is between about 90% and about 95% A porosity between about 75% and 90% may also be acceptable. The pore size of the second honeycomb layer 14 should be about 10% of the pore size of the first honeycomb layer 10. The pore size of each honeycomb layer, however, will vary depending on the design specification based on factors such as flywheel weight and volume.

The second honeycomb layer 14 may be any porous material such that the pores may absorb energy by deforming if the flywheel 6 fails. For example, the second honeycomb layer 14 may be an expanded metal or a deformable polymeric material. If the second honeycomb layer 14 is a metal, metals such as aluminum, brass or steel may be used. If the second honeycomb layer 14 is a polymeric material, polymers such as a polystyrene foam may be suitable for the second honeycomb layer 14. Preferably, the layer 14 will be a low outgassing material, such as metal, if operation under a vacuum is expected.

The second honeycomb layer 14 may be discontinuous if the surrounding structure is capable of containing the hoop stress of the honeycomb layer 14. Preferably, the second honeycomb layer 14 is a continuous structure to provide sufficient hoop strength to assist a containment vessel 18 that surrounds the honeycomb structure 8 in containing a flywheel 6 failure.

An annular shaped, protective layer 16 with an outer diameter and an inner diameter equal to or greater than the outer diameter of the second honeycomb layer 14, may be positioned around the second honeycomb layer 14. This protective layer 16 stops the progression of small, sharp fragments of flywheel material that did not get captured in the first or second honeycomb layers. The layer 16 may also act as blast containment if oxygen leaks into the system. The protective layer 16 may be a metal such as steel. The layer 16 may also be a composite such as a glass fiber composite. Preferably, the layer 16 is a metal such as steel because of its resistance to piercing and ability to be easily formed.

The device 2 also includes means for supporting the honeycomb structure 8 such that the honeycomb structure 8 rotates independently from the flywheel 6. For example, the honeycomb structure 8 may rest on the containment vessel 18. Since the honeycomb structure 8 is not attached to the flywheel 6 or vessel 18, it rotates independently upon application of a strong torque from debris impact.

The containment vessel 18 may be any material such that the vessel 18 will not increase friction between the vessel 18 and the honeycomb structure 8. For example, the vessel 18 may be a metal or a composite. If the vessel 18 is a metal, metals such as steel are suitable. If the vessel is a composite, composites such as metal matrix composites are suitable, but resin matrix composites are preferred. The containment vessel 18 may also include a metal coating such as brass, nickel or chrome on the inner surface of the vessel 18. This metal coating provides an effective friction surface. The vessel 18 should also be sufficient for blast containment which may be necessary if oxygen leaks into a vacuum chamber. The present invention offers several advantages over the prior art. For example, the honeycomb structure 8 may capture dust within its pores 11 upon flywheel 6 failure unlike conventional metal layers. Conventional metal layers are also heavier than the honeycomb structure 8 and cannot dissipate a significant amount of energy into material strain upon flywheel 6 failure. Thus, the present invention may make a flywheel energy storage system practical in mobile applications, such as in vehicles.

The invention is not limited to the particular embodiments shown and described herein. Various changes and modifications may be made without departing from the spirit or scope of the claimed invention.

I claim:

1. A flywheel containment device comprising:
   (a) a shaft defining an axis of rotation,
   (b) a flywheel having an annular shaped cross-section perpendicular to the axis of rotation, wherein the flywheel is connected to the shaft and has an outer diameter and an inner diameter,
   (c) an annular shaped honeycomb structure with an annular shaped honeycomb layer having an outer diameter and an inner diameter greater than the outer diameter of the flywheel, wherein the honeycomb layer comprises a plurality of pores that are open on the inner diameter of the honeycomb layer to trap dust created if the flywheel fails and is positioned around the outer diameter of the flywheel such that the honeycomb structure is independent from the flywheel, (d) means for supporting the honeycomb structure such that the honeycomb structure is capable of rotating independently from the flywheel, and (e) a containment vessel positioned around the outer diameter of the honeycomb structure.

2. The device of claim 1 wherein the honeycomb layer has a porosity of at least about 90%.

3. The device of claim 1 wherein the pores are sized such that the honeycomb layer may withstand momentum effects from the dust filling the pores.

4. The device of claim 1 wherein the pores are sized to capture at least about 125% of a composite flywheel's matrix in the form of dust.

5. The device of claim 1 wherein the honeycomb layer comprises a metal.

6. The device of claim 1 wherein the honeycomb layer comprises a polymeric material.

7. The device of claim 1 wherein the containment vessel material comprises a composite.

8. The device of claim 7 wherein the containment vessel includes a metal coating on the vessel's inner surface.

9. The device of claim 1 wherein the honeycomb structure further comprises:

(f) an annular shaped, metal layer having an outer diameter and inner diameter equal to or greater than the outer diameter of the honeycomb layer, wherein the metal layer is positioned around the outer diameter of the honeycomb layer, and (g) an annular shaped, second honeycomb layer with an outer diameter and an inner diameter equal to or greater than the outer diameter of the metal layer, wherein the second honeycomb layer is positioned around the metal layer and comprises a plurality of pores that absorb energy by deforming if the flywheel fails.

10. The device of claim 9 further comprising:

(h) an annular shaped, protective layer with an outer diameter and an inner diameter equal to or greater than the outer diameter of the second honeycomb layer, wherein the protective layer is positioned around the second honeycomb layer.

11. The device of claim 10 wherein the protective layer comprises a metal.

12. The device of claim 9 wherein the metal layer's inner diameter is coated with a material capable of blunting sharp objects.

13. The device of claim 9 wherein the metal layer is coated with nickel.

14. The device of claim 9 wherein the metal layer comprises steel.

15. The device of claim 9 wherein the second honeycomb layer has a porosity between about 90% and 95%.

16. The device of claim 9 wherein the pore size of the second honeycomb layer is about 10% of the pore size of the first honeycomb layer.

17. The device of claim 9 wherein the second honeycomb layer comprises a metal.

18. The device of claim 9 wherein the second honeycomb layer comprises a polymeric material.

* * * * *